US012634582B2

(12) United States Patent
Park et al.

(10) Patent No.: US 12,634,582 B2
(45) Date of Patent: May 19, 2026

(54) CAMERA MODULE HAVING IMPACT ABSORBING STRUCTURE AND ELECTRONIC DEVICE INCLUDING SAME CAMERA MODULE

(71) Applicant: SAMSUNG ELECTRONICS CO., LTD., Suwon-si (KR)

(72) Inventors: Jaeheung Park, Suwon-si (KR); Bongchan Kim, Suwon-si (KR); Hyungjin Rho, Suwon-si (KR); Jaehyoung Park, Suwon-si (KR); Kwangseok Byon, Suwon-si (KR); Hyosang An, Suwon-si (KR); Jonghoon Won, Suwon-si (KR); Jiyeon Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 41 days.

(21) Appl. No.: 18/774,395

(22) Filed: Jul. 16, 2024

(65) Prior Publication Data

US 2025/0016450 A1       Jan. 9, 2025

Related U.S. Application Data

(63) Continuation of application No. PCT/KR2022/021510, filed on Dec. 28, 2022.

(51) Int. Cl.
H04N 23/68 (2023.01)
H04N 23/52 (2023.01)
(Continued)

(52) U.S. Cl.
CPC ........... H04N 23/687 (2023.01); H04N 23/52 (2023.01); H04N 23/55 (2023.01); H04N 23/57 (2023.01)

(58) Field of Classification Search
CPC .... G03B 2205/0015; G03B 2205/0053; G03B 2205/0069; G03B 3/10; G03B 30/00;
(Continued)

(56) References Cited

U.S. PATENT DOCUMENTS

| | | | |
|---|---|---|---|
| 10,287,159 B2 | 5/2019 | Matsuoka et al. | |
| 10,317,649 B2 | 6/2019 | Sharma et al. | |

(Continued)

FOREIGN PATENT DOCUMENTS

| | | | |
|---|---|---|---|
| CN | 208110230 U | 11/2018 | |
| EP | 4239404 A1 * | 9/2023 | ............. H04N 23/55 |

(Continued)

OTHER PUBLICATIONS

European Extended Search Report issued Apr. 26, 2024 by the European Patent Office for EP Patent Application No. 22835545.9.
(Continued)

*Primary Examiner* — Amy R Hsu
(74) *Attorney, Agent, or Firm* — Sughrue Mion, PLLC

(57) ABSTRACT

Disclosed are a camera module (130) including a shock mitigation member (160) and an electronic device (100) including the camera module (130). The camera module (130) according to an embodiment may include a frame (140), at least one shock mitigation member (160), and a lens assembly (110). Provided is a structure for preventing or at least partially absorbing a shock between the lens assembly (110) and another component while coming into contact with a fixing portion as the lens assembly (110) moves. In addition, various other embodiments identified through the specification are possible.

20 Claims, 11 Drawing Sheets

(51) Int. Cl.
   *H04N 23/55* (2023.01)
   *H04N 23/57* (2023.01)

(58) Field of Classification Search
   CPC .......... G03B 5/00; H04N 23/52; H04N 23/55;
   H04N 23/57; H04N 23/687
   See application file for complete search history.

(56) References Cited

U.S. PATENT DOCUMENTS

| | | | |
|---|---|---|---|
| 2009/0303621 | A1 | 12/2009 | Sue et al. |
| 2015/0055231 | A1 | 2/2015 | Hagiwara |
| 2015/0296143 | A1* | 10/2015 | Kang ........................ G03B 3/10 |
| | | | 348/208.11 |
| 2016/0044232 | A1 | 2/2016 | Kim et al. |
| 2017/0052388 | A1* | 2/2017 | Kim ...................... G02B 27/646 |
| 2018/0059381 | A1 | 3/2018 | Sharma et al. |
| 2020/0310148 | A1* | 10/2020 | Chiu ...................... G03B 30/00 |
| 2020/0344417 | A1 | 10/2020 | Xu et al. |
| 2021/0247663 | A1* | 8/2021 | Lee .......................... G02B 7/09 |

FOREIGN PATENT DOCUMENTS

| | | | |
|---|---|---|---|
| JP | 6185334 | B2 | 8/2017 |
| JP | 2020-166129 | A | 10/2020 |
| JP | 2021-117461 | A | 8/2021 |
| KR | 10-2008-0046627 | A | 5/2008 |
| KR | 10-1005773 | B1 | 1/2011 |
| KR | 10-2014-0058466 | A | 5/2014 |
| KR | 10-1483782 | B1 | 1/2015 |
| KR | 10-2015-0118008 | A | 10/2015 |
| KR | 10-2016-0019280 | A | 2/2016 |
| KR | 10-2017-0006731 | A | 1/2017 |
| KR | 10-2041636 | B1 | 11/2019 |
| KR | 10-2144490 | B1 | 8/2020 |
| KR | 10-2021-0102124 | A | 8/2021 |

OTHER PUBLICATIONS

International Search Report (PCT/ISA/210) issued by the International Searching Authority on Apr. 13, 2023 in corresponding International Application No. PCT/KR2022/021510.

Written Opinion (PCT/ISA/237) issued by the International Searching Authority on Apr. 13, 2023 in corresponding International Application No. PCT/KR2022/021510.

Communication dated Feb. 5, 2026 issued by the European Patent Office in European Patent Application No. 22835545.9.

Communication dated Feb. 25, 2026 issued by the Intellectual Property India in Indian Patent Application No. 202417049722.

* cited by examiner

CAMERA MODULE HAVING IMPACT ABSORBING STRUCTURE AND ELECTRONIC DEVICE INCLUDING SAME CAMERA MODULE

CROSS-REFERENCE TO RELATED APPLICATION(S)

This application is a Continuation Application of International Application PCT/KR2022/021510 filed on Dec. 28, 2022, which claims benefit of Korean Patent Application No. 10-2022-0007301 and 10-2022-0041363, filed on Jan. 18, 2022 and Apr. 1, 2022, respectively, at the Korean Intellectual Property Office, the disclosures of which are incorporated herein in their entireties by reference.

FIELD

Various embodiments disclosed herein relate to a camera module and an electronic device including the camera module.

BACKGROUND ART

A camera module, which is a device for capturing a subject as a photo or a video, may be mounted in various devices such as a smartphone or a tablet PC as well as a digital camera.

The camera module may include a structure for moving at least one lens included in the camera module in order to acquire a desired photo or video. For example, the camera module may implement an auto focus function or a zoom function by moving a lens module including at least one lens along the direction of an optical axis of the lens, or implement an image stabilization (optical image stabilization (OIS)) function for compensating shaking of the camera module by shifting or tilting the lens module.

The camera module may include an image sensor configured to convert light forming an image through the moved lens module into an electrical signal. An electronic device may generate a photo or a video, based on a signal output from the image sensor of the camera module.

SUMMARY

A camera module according to an embodiment includes a frame, at least one shock mitigation member having one end fixed to the frame, and a lens assembly configured to receive at least one lens and disposed to be movable in a first direction or a second direction opposite to the first direction within the frame. The lens assembly includes a first fixing portion configured on one side thereof and a second fixing portion disposed to be spaced apart from the first fixing portion in the first direction. At least a part of the at least one shock mitigation member may be disposed between the first fixing portion and the second fixing portion to come into contact with the first fixing portion as the lens assembly moves in the first direction. Alternatively, the at least one shock mitigation member may be disposed to come into contact with the second fixing portion as the lens assembly moves in the second direction.

A camera module according to an embodiment may include a frame, a lens assembly configured to receive at least one lens and including a recess or an opening disposed on one side thereof, an actuator configured to move the lens assembly in a direction parallel to an optical axis of the at least one lens, and a shock mitigation member configured to protrude from the frame into the recess or the opening to be at least partially received in the recess or the opening. The shock mitigation member may be configured to come into contact with one side of the recess or the opening by movement of the lens assembly.

An electronic device according to an embodiment includes a camera module, a memory configured to store instructions, and a processor configured to execute the instructions to control an operation of the camera module. The camera module includes a frame, at least one shock mitigation member having one end fixed to the frame and a lens assembly configured to receive at least one lens and disposed to be movable in a first direction or a second direction opposite to the first direction within the frame. The camera module may include an actuator configured to move the lens assembly under a control of the processor.

The lens assembly includes a first fixing portion configured on one side thereof and a second fixing portion disposed to be spaced apart from the first fixing portion in the first direction. At least a part of the at least one shock mitigation member is disposed between the first fixing portion and the second fixing portion. The at least one shock mitigation member may be disposed to come into contact with the first fixing portion as the lens assembly moves in the first direction in a state in which power is not supplied to the actuator, or to come into contact with the second fixing portion as the lens assembly moves in the second direction.

BRIEF DESCRIPTION OF DRAWINGS

In relation to the description of drawings, the same or similar reference numerals may be used for the same or similar components.

DETAILED DESCRIPTION

Hereinafter, various embodiments of the disclosure are described with reference to the accompanying drawings. However, this is not intended to limit the disclosure to specific embodiments, and should be understood to include various modifications, equivalents, and/or alternatives to embodiments of the disclosure.

Since a lens module is configured to be movable in a camera module, a shock is generated against another structure in the camera module as the lens module moves in the camera module, so that noise or vibration may be generated. Alternatively, a device in the camera module may be damaged by the shock.

In addition, when a structure for mitigating the shock is disposed in the camera module, the camera module may have an increased size. There is a problem in that, due to the increase in the size of the camera module, when the camera module is disposed in a device having a small thickness, such as a smartphone, a part of the camera module protrudes from the exterior of a housing of the device.

Various embodiments disclosed herein may provide a camera module and an electronic device including a shock mitigation member configured to mitigate a shock generated by movement of a lens module in the camera module.

In addition, various embodiments may provide a camera module and an electronic device capable of reducing the degree of protrusion to the outside of the device by not increasing the size (for example, the height of the entire camera module compared to the height of a lens barrel portion) of the camera module while including a shock mitigation member.

The effects obtainable from the disclosure are not limited to the above-mentioned effects, and other effects not mentioned may be clearly understood by a person skilled in the art to which the disclosure belongs from the following description.

In addition, various effects directly or indirectly identified through this document may be provided.

Figure 1:
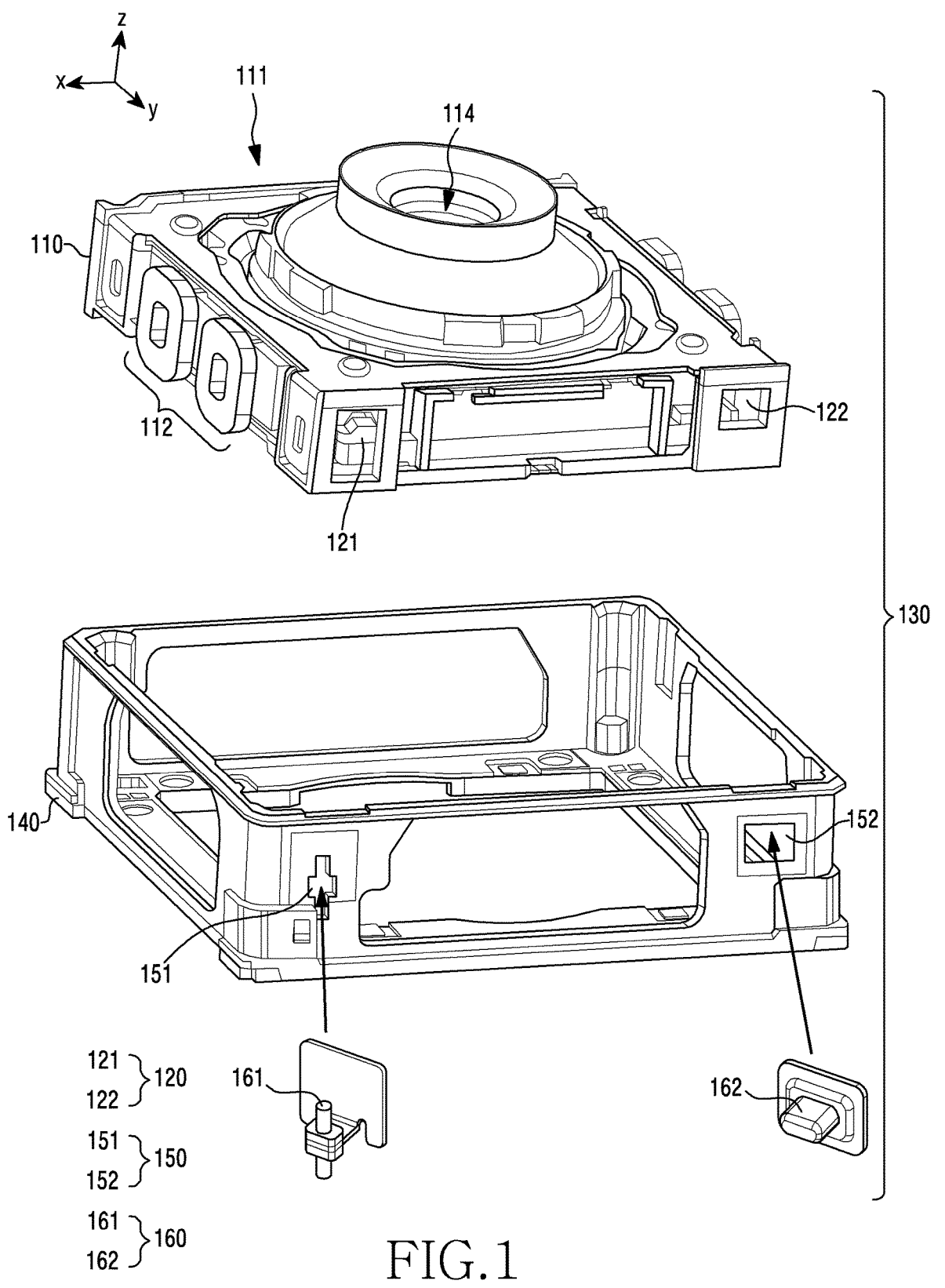
FIG. 1 is a perspective view illustrating a lens assembly, a frame, and a shock mitigation member included in a camera module according to an embodiment.
Figure 2:
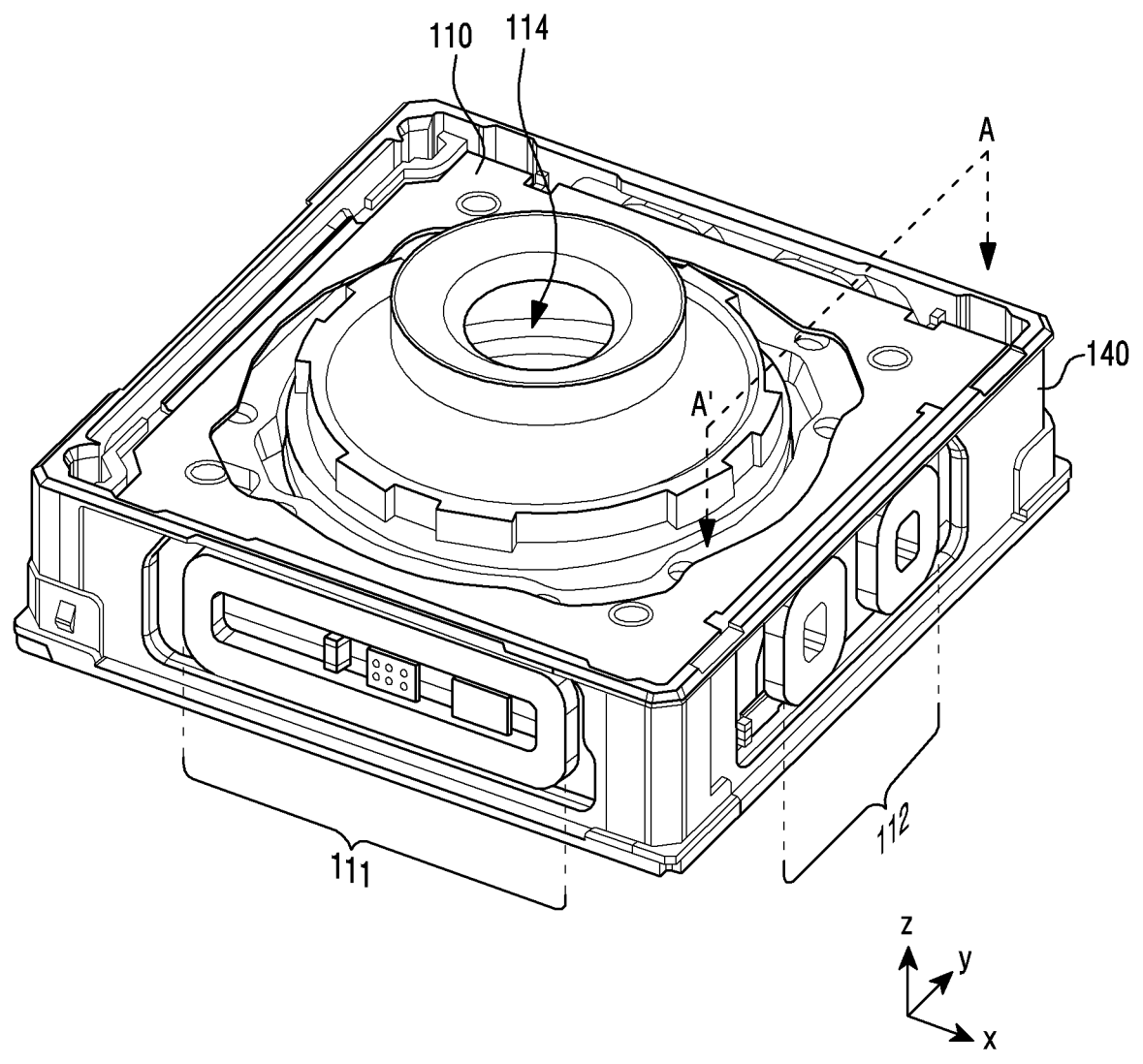
FIG. 2 is a perspective view illustrating a state in which a lens assembly, a frame, and a shock mitigation member included in a camera module are coupled to each other according to an embodiment.
Figure 3:
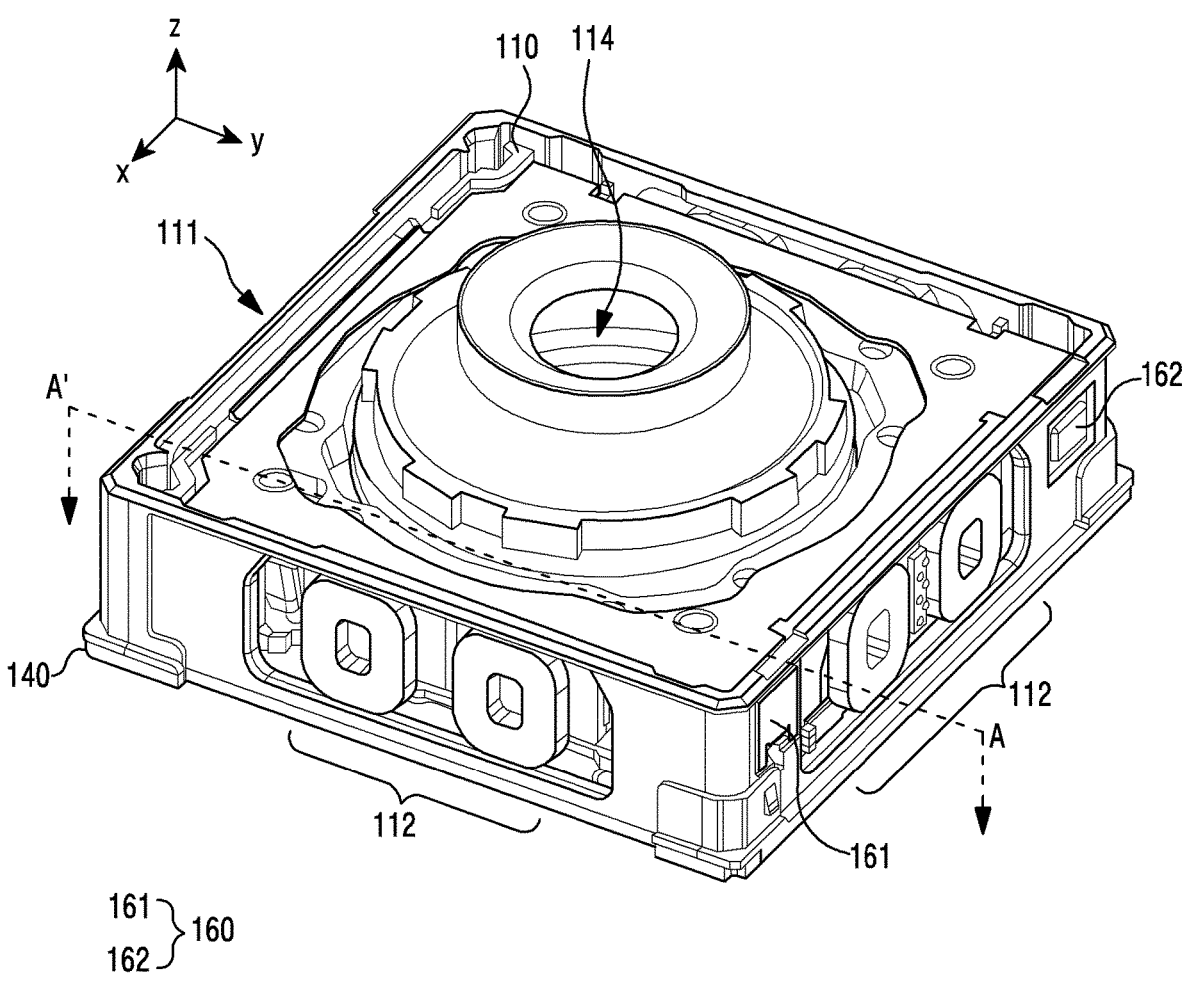
FIG. 3 is a perspective view illustrating a state in which a lens assembly, a frame, and a shock mitigation member included in a camera module are coupled to each other, viewed from a different direction, according to an embodiment.

FIG. 1 is a perspective view illustrating a lens assembly 110, a frame 140, and a shock mitigation member 160 included in a camera module 130 according to an embodiment. FIG. 2 is a perspective view illustrating a state in which the lens assembly 110, the frame 140, and the shock mitigation member 160 included in the camera module 130 are coupled to each other according to an embodiment. FIG. 3 is a perspective view illustrating a state in which the lens assembly 110, the frame 140, and the shock mitigation member 160 included in the camera module 130 are coupled to each other according to an embodiment.

In this document, the lens assembly 110 refers to the unit of a component which is integrally coupled with and moves together with a lens barrel which receives at least one lens 114. The camera module 130 according to an embodiment may include a driving portion for moving the lens assembly 110. According to the embodiment shown in FIG. 1, the camera module 130 may include an actuator 111. The actuator 111 may include at least one magnet. The actuator 111 may move the lens assembly 110 by using a magnetic force generated by the magnet. The actuator 111 may include an auto focus actuator which moves the lens assembly 110 to perform an auto focus (AF) function. The camera module 130 may further include an optical image stabilization (OIS) actuator 112 for performing OIS. However, the disclosure is not limited to the configuration of the actuator of FIGS. 1 to 3.

The lens assembly 110 according to an embodiment may be received in the frame 140. When power is supplied to the actuator 111, the lens assembly 110 may move in a state of being received in the frame 140. For example, when an electronic device (e.g., an electronic device 100 of FIG. 11) including the camera module 130 executes an auto focus function, the electronic device may move the lens assembly 110 in a first direction (for example, the +z-axis direction) or a second direction (for example, the −z-axis direction) opposite to the first direction by controlling power supplied to the actuator 111 so that light forms an image on an image sensor. In other words, the lens assembly 110 may be disposed to be moveable in the first and the second direction by controlling power supplied to the actuator 111.

The camera module 130 according to an embodiment may control power supplied to the camera module 130 according to whether a camera function of the electronic device (e.g., the electronic device 100 of FIG. 11) including the camera module 130 is executed. When the camera function is not executed, the electronic device may prevent power from being supplied to the camera module 130. In this case, since the actuator 111 of the camera module 130 is also deactivated, the lens assembly 110 may move within the frame 140 when the electronic device moves. When the lens assembly 110 moves in a state in which the actuator 111 is deactivated, the lens assembly 110 may collide with another component of the camera module 130. When the lens assembly 110 collides with another component, noise and vibration may be induced. When the amount of shock generated by collision is large, damage to the lens assembly 110 or another component may occur.

In a case of attaching a cushioning material having a sufficient size to a position where the lens assembly 110 and another component are in contact with each other, in order to reduce the amount of shock caused by collision, due to the size of the cushioning material, the height in the direction of an optical axis of the lens assembly 110 or the camera module 130 may increase. When the height in the direction of the optical axis of the lens assembly 110 or the camera module 130 increases, the degree to which at least a part of the camera module 130 protrudes from the exterior of the electronic device including the camera module 130 increases. Accordingly, the camera module 130 according to an embodiment may include the shock mitigation member 160 disposed in an opening 120 configured or disposed on one side of the lens assembly 110. The opening 120 has a shape for receiving the shock mitigation member 160, and is not limited to the form shown in FIG. 1. The shape of the opening 120 may correspond with a shape of the mitigation member 160 such that the opening 120 is covered, in particular completely covered, by the mitigation member 160 received in the opening 120. For example, the opening 120 may be replaced in the form of a recess.

According to an embodiment, the cushioning material of the shock mitigation member 160 may be disposed in the opening 120 of the lens assembly 110 through an opening 150 configured or disposed in the frame 140. The shape of the opening 150 of the frame 140 may correspond with a shape of the mitigation member 160 and/or a shape of the opening 120 of the lens assembly 110 such that the opening 150 of the frame 140 is covered by the mitigation member 160 received in the opening 120 of the lens assembly 110. The camera module 130 according to an embodiment may include at least one shock mitigation member 160. The at least one shock mitigation member 160 may include at least one of a structure or a material for absorbing a shock when collision with another component occurs.

Although FIG. 1 illustrates the camera module 130 including a first shock mitigation member 161 and a second shock mitigation member 162 having different shapes, this is for convenience of description and the disclosure is not limited thereto. The camera module 130 according to various embodiments may include multiple shock mitigation members 160 having the same shape. In particular, the camera module 130 may include multiple shock mitigation members 160 having the same shape and at least one additional shock mitigation member 160 having a different shape.

FIG. 1 illustrates that the shock mitigation member 160 includes the first shock mitigation member 161 and the second shock mitigation member 162, but the disclosure is not limited thereto. The camera module 130 according to various embodiments may include one shock mitigation member 160 or multiple shock mitigation members 160.

The opening 150 configured or disposed in the frame 140 may be configured to have a shape corresponding to the shape of the shock mitigation member 160 to be inserted. Referring to FIG. 1, when the shape of the shock mitigation member 160 is the shape of the first shock mitigation member 161, the opening 150 may be configured to have the shape of a first opening 151. When the shape of the shock mitigation member 160 is the shape of the second shock mitigation member 162, the opening 150 may be configured to have the shape of a second opening 152.

The opening 120 configured or disposed in the lens assembly 110 may be configured such that the shock mitigation member 160 comes into contact with one side of the opening 120 as the lens assembly 110 moves within the frame 140. Accordingly, the size or shape of the opening 120 may be determined according to at least one of the size or shape of the shock mitigation member 160. For example, when the shock mitigation member 160 has the shape of the first shock mitigation member 161, the opening 120 may be configured to have the shape of a first opening 121. When the shock mitigation member 160 has the shape of the second shock mitigation member 162, the opening 120 may be configured to have the shape of a second opening 122.

Figures 4A, 4B, 4C:
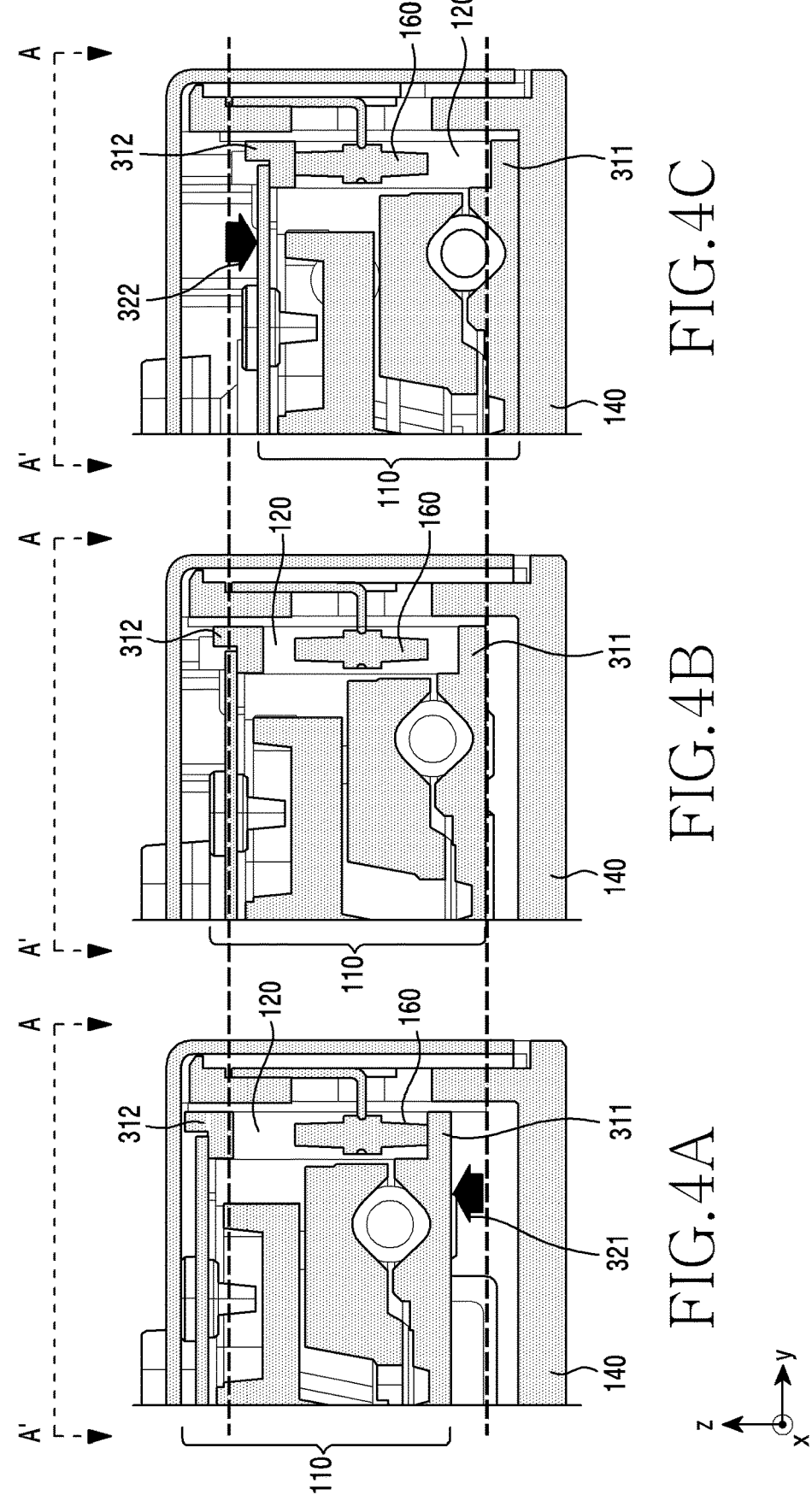
FIGS. 4A-4C are cross-sectional views illustrating the contact between a shock mitigation member and a fixing portion according to movement of a lens assembly included in a camera module according to an embodiment.

FIGS. 4A-4C are cross-sectional views illustrating the contact between the shock mitigation member 160 and a fixing portion 311 or 312 according to movement of the lens assembly 110 included in the camera module 130 according to an embodiment. FIGS. 4A-4C are views illustrating at least a part of cross section, taken along A-A', of the camera module 130 of FIG. 2.

The lens assembly 110 of the camera module 130 according to an embodiment includes a first fixing portion 311 and a second fixing portion 312 disposed to be spaced apart from the first fixing portion 311. For example, the first fixing portion 311 may include a surface facing a first direction 321 among surfaces forming the opening 120. The second fixing portion 312 may include a surface facing a second direction 322 among surfaces forming the opening 120.

The lens assembly 110 of the camera module 130 according to an embodiment may move in the first direction 321 or the second direction 322 opposite to the first direction 321 within the frame 140. For example, the first direction 321 and the second direction 322 may be a direction (the z-axis direction of FIGS. 4A-4C) parallel to an optical axis of a lens included in the lens assembly 110. However, the disclosure is not limited thereto. The first fixing portion 311 and/or the second fixing portion 312 may be configured to limit a movement range of the lens assembly 110.

In the state shown in FIG. 4B, when the lens assembly 110 of the camera module 130 according to an embodiment moves in the first direction 321, the first fixing portion 311 moves along the moving direction of the lens assembly 110, so that the first fixing portion 311 may be in contact with the shock mitigation member 160 as shown in FIG. 4A. A moving speed of the lens assembly 110 in the first direction 321 may be reduced by compression or deformation of the shock mitigation member 160 generated by the contact between the first fixing portion 311 and the shock mitigation member 160. Accordingly, the amount of shock generated by the lens assembly 110 moving in the first direction 321 to collide with another component may be reduced.

In the state shown in FIG. 4B, when the lens assembly 110 of the camera module 130 according to an embodiment moves in the second direction 322, the second fixing portion 312 moves along the moving direction of the lens assembly 110, so that the second fixing portion 312 may be in contact with the shock mitigation member 160 as shown in FIG. 4C. A moving speed of the lens assembly 110 in the second direction 322 may be reduced by compression or deformation of the shock mitigation member 160 generated by the contact between the second fixing portion 312 and the shock mitigation member 160. Accordingly, the amount of shock generated by the lens assembly 110 moving in the second direction 322 to collide with another component may be reduced.

The shock mitigation member 160 according to an embodiment may come into contact with the fixing portion 311 or 312 before the lens assembly 110 comes into contact with another component positioned in the moving direction.

Figures 5A, 5B:
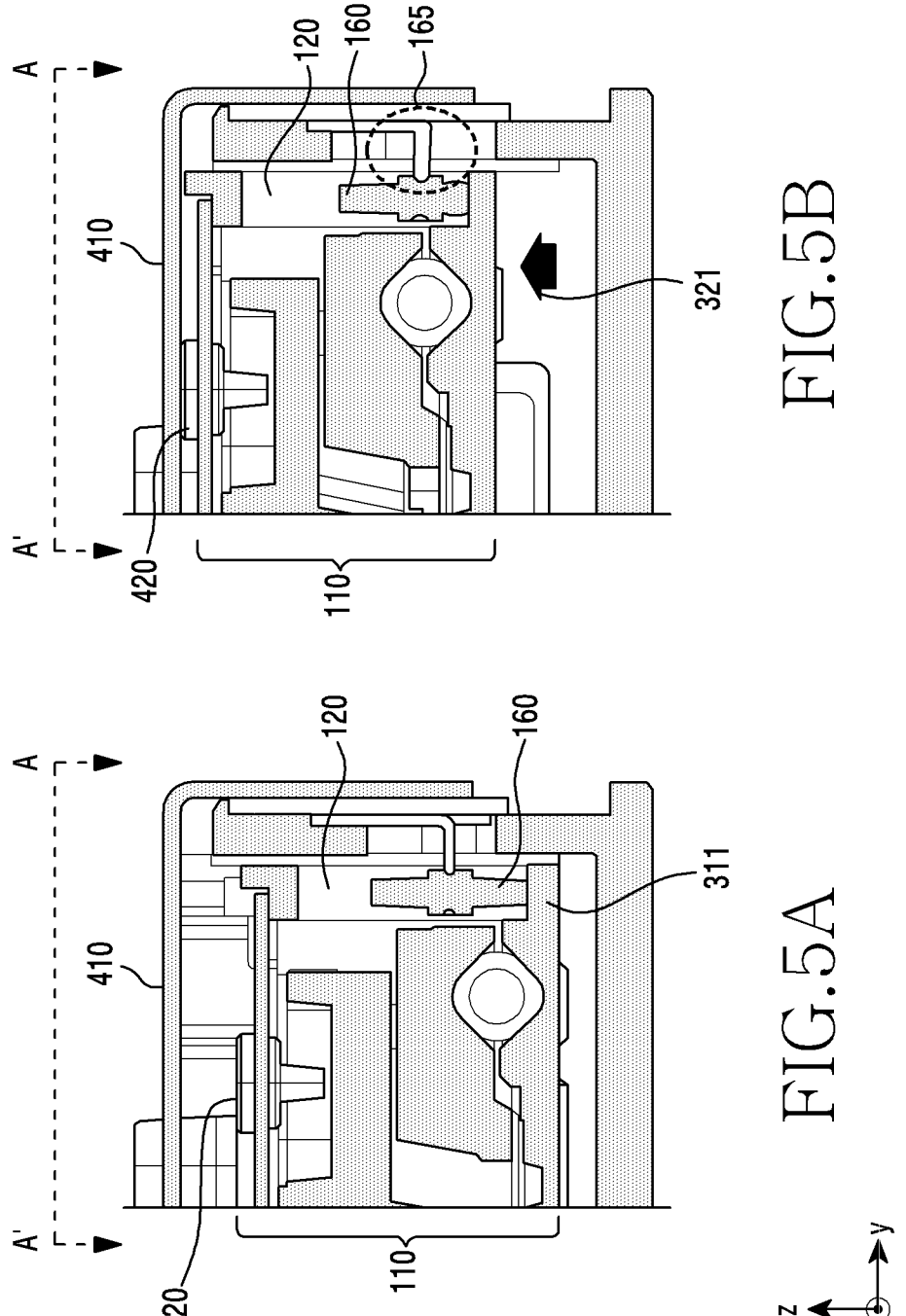
FIGS. 5A and 5B are cross-sectional views illustrating an operation in which a lens assembly of a camera module moves in a first direction according to an embodiment.

FIGS. 5A and 5B are cross-sectional views illustrating an operation in which the lens assembly 110 of the camera module 130 moves in the first direction 321 according to an embodiment.

Referring to FIG. 5A, the lens assembly 110 moves in the first direction 321, so that the shock mitigation member 160 may come into contact with the first fixing portion 311 within the opening 120. At the time point when the shock mitigation member 160 is in contact with the first fixing portion 311, the lens assembly 110 may be in a state of not being in contact with another component positioned in the first direction 321. Another component may be a rigid body included in the electronic device 100 or the camera module 130. For example, another component may be a cover 410 coupled to an upper end of the frame 140 to cover at least a part of the lens assembly 110. In this document, another component, e.g., the cover 410 may be referred as a third fixing portion.

Referring to FIG. 5B, when the lens assembly 110 further moves in the first direction 321 after the shock mitigation member 160 is in contact with the first fixing portion 311, at least a part 420 of the lens assembly 110 may come into contact with another component, for example the cover 410. At least a part 165 of the shock mitigation member 160 is deformed while the lens assembly 110 is moved from the state shown in FIG. 5B to the state shown in FIG. 5B, so that a moving speed of the lens assembly 110 may be reduced. The shock mitigation member 160 may include a reversible elastically deformable or bendable structure, i.e. a cantilever-shaped structure. The reversible elastically deformable or bendable structure may be reversible elastically deformable in the first direction 321 and in the second direction 322 between the first fixing portion 311 and the second fixing portion 312. For example, when the shock mitigation member 160 includes a cantilever-shaped structure having one end fixed to the frame 140, the cantilever-shaped structure may be deformed or bent, in particular reversible elastically deformed or bent, to reduce the moving speed of the lens assembly 110. Additionally or alternatively, the moving speed of the lens assembly 110 may be reduced while a cushioning material of the shock mitigation member 160 is deformed and/or compressed. For example, the cushioning material may include reversible elastically deformable material, for example an elastomer, which is deformed when a shock is applied. In this document, the term indicating that the cantilever-shaped structure is fixed to the frame 140 refers to not only a structure in which a cantilever is directly fixed to the frame 140, but also a structure in which a structure extending from one end of the cantilever is fixed to the frame 140.

According to an embodiment, the camera module 130 may move the lens assembly 110 to the state shown in FIG. 5B in order to perform a focus adjustment function. The shock mitigation member 160 may be configured such that the resistance applied to the first fixing portion 311 by deformation of at least the part 165 of the shock mitigation member 160 is smaller than a driving force generated by the actuator 111, in order for the lens assembly 110 to move to the state shown in FIG. 5B according to an operation of the actuator 111 of the camera module 130. For example, the hardness of a material or the thickness of the shock mitigation member 160 may be determined based on the driving force generated by the actuator 111.

Figure 6B:
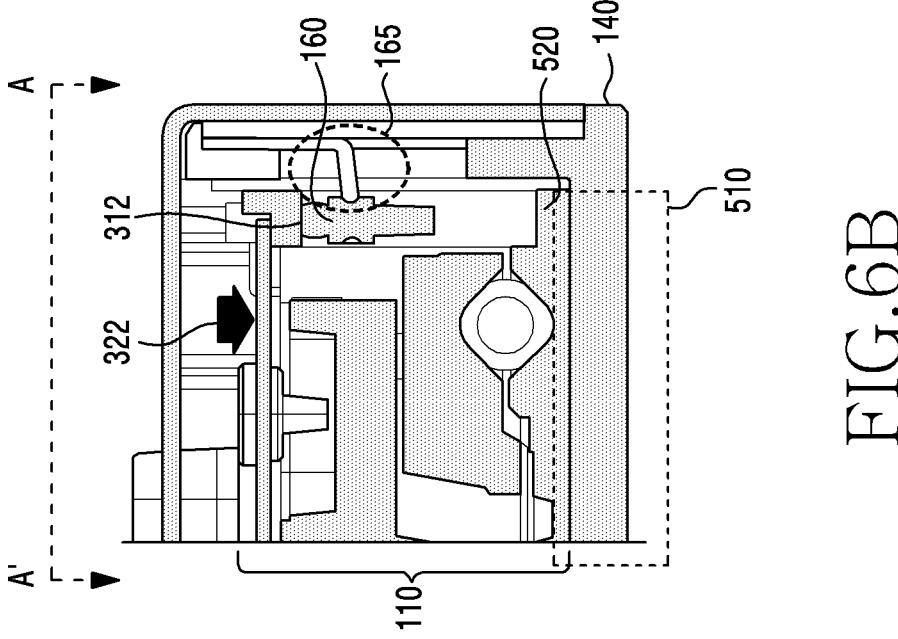
FIGS. 6A and 6B are cross-sectional views illustrating an operation in which a lens assembly of a camera module moves in a second direction according to an embodiment.
Figure 6A:
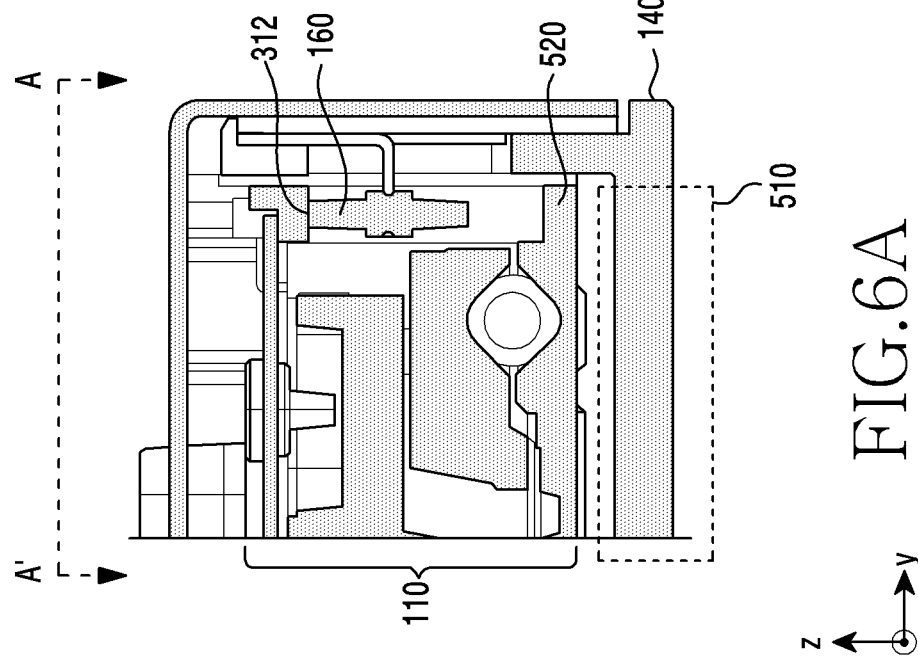

FIGS. 6A and 6B are cross-sectional views illustrating an operation in which the lens assembly 110 of the camera module 130 moves in the second direction 322 according to an embodiment.

Referring to FIG. 6A, the lens assembly 110 moves in the second direction 322, so that the shock mitigation member 160 may come into contact with the second fixing portion 312 within the opening 120. At the time point when the shock mitigation member 160 is in contact with the second fixing portion 312, the lens assembly 110 may be in a state of not being in contact with another component positioned in the second direction 322. Another component may be a rigid body included in the electronic device 100 or the camera module 130. For example, another component may be a part forming at least a part of a bottom surface 510 of the frame 140.

Referring to FIG. 6A, when the lens assembly 110 further moves in the second direction 322 after the shock mitigation member 160 is in contact with the second fixing portion 312, at least the part 520 of the lens assembly 110 may come into contact with another component 510. In this document, another component 510 may referred as the third fixing portion. At least the part 165 of the shock mitigation member 160 is deformed while the lens assembly 110 is moved from the state shown in FIG. 6A to the state shown in FIG. 6B, so that a moving speed of the lens assembly 110 may be reduced. For example, when the shock mitigation member 160 includes the cantilever-shaped structure having one end fixed to the frame 140, the cantilever-shaped structure is deformed or bent, in particular reversible elastically deformed or bent, so that the moving speed of the lens assembly 110 may be reduced.

According to an embodiment, the camera module 130 may move the lens assembly 110 to the state shown in FIG. 6B in order to perform a focus adjustment function. The shock mitigation member 160 may be configured such that the resistance applied to the second fixing portion 312 by deformation of at least the part 165 of the shock mitigation member 160 is smaller than a driving force generated by the actuator 111, in order for the lens assembly 110 to move to the state shown in FIG. 6B according to an operation of the actuator 111 of the camera module 130.

Figure 7:
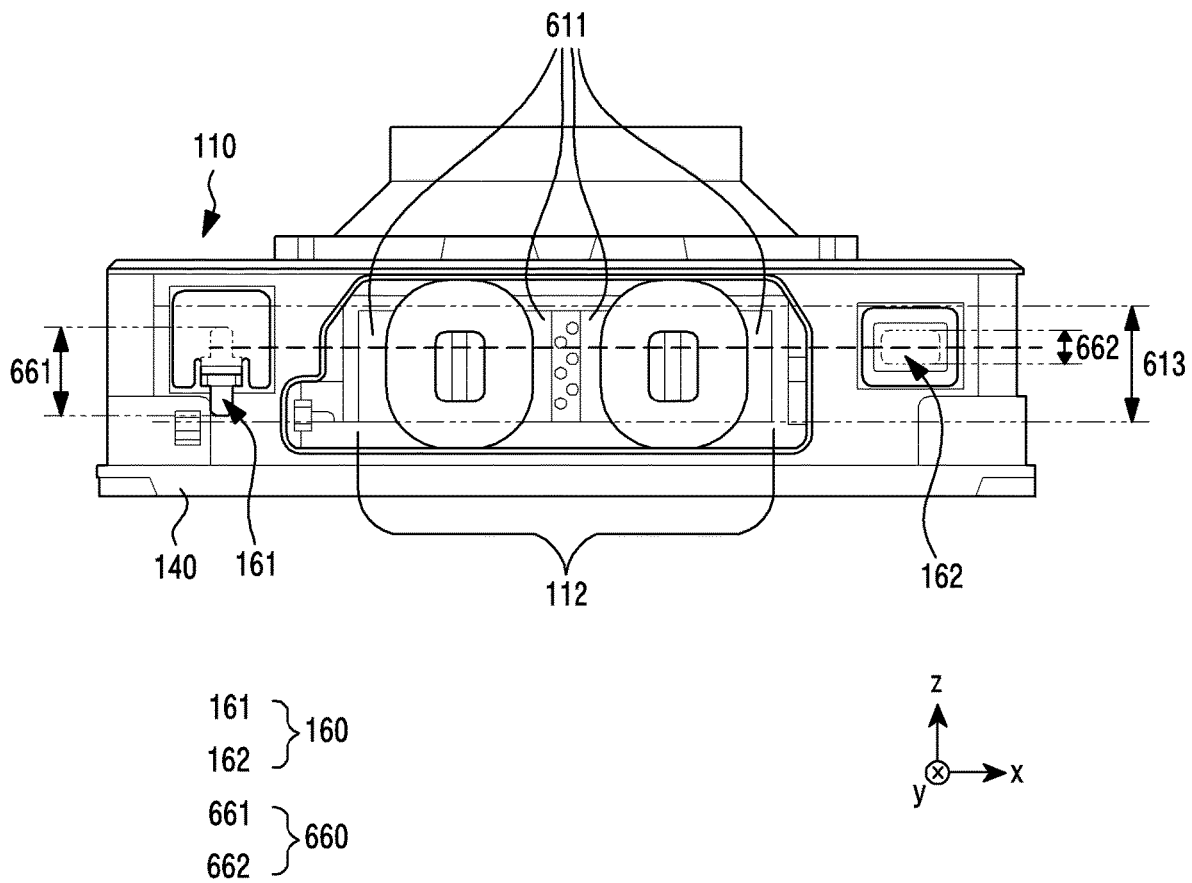
FIG. 7 is a side view illustrating a position of a shock mitigation member according to an embodiment.

FIG. 7 is a side view illustrating a position of the shock mitigation member 160 according to an embodiment.

The OIS actuator 112 of the camera module 130 according to an embodiment may include at least one magnet 611.

The shock mitigation member 160 according to an embodiment may be disposed to be spaced apart from a position where the magnet 611 is disposed. According to an embodiment, the first shock mitigation member 161 may be disposed to be spaced apart from the position, where the magnet 611 is disposed, in a third direction (x-axis direction) perpendicular to an optical axis. The camera module 130 according to an embodiment may further include a second shock mitigation member 162 disposed to be spaced apart from the position, where the magnet 611 is disposed, in a fourth direction (−x-axis direction) opposite to the third direction.

The shock mitigation member 160 according to an embodiment may be disposed such that a height 660 of the shock mitigation member 160 in a direction (z-axis direction) parallel to the optical axis at least partially, preferably at least by a half, particularly preferred completely, overlaps a height 613 of the magnet 611 in a direction parallel to the optical axis. In this specification, the expression that the height of the shock mitigation member 160 overlaps the height of the magnet 611 may imply a case in which height of at least a part of the area where the shock mitigation member 160 is disposed overlaps at least a part of the height of the area where the magnet 611 is disposed, or a case in which the height of the center of the shock mitigation member 160 is included within the height of the area where the magnet 611 is disposed. A height 661 of the first shock mitigation member 161 according to an embodiment may at least partially, preferably at least by a half, particularly preferred completely, overlap the height 613 of the magnet 611. A height 662 of the second shock mitigation member 162 according to an embodiment may at least partially, preferably at least by a half, particularly preferred completely, overlap the height 613 of the magnet 611. The height 660 of the shock mitigation member 160, in particular the height 661 of the first shock mitigation member 161 and/or the height 662 of the second shock mitigation member 162, may be smaller than the height 613 of the magnet 611.

According to an embodiment, the shock mitigation member 160 may be disposed such that the height in the optical axis direction of a part of the shock mitigation member 160 coming into contact with the first fixing portion (311 of FIGS. 4A-4C) and the height in the optical axis direction of a part of the shock mitigation member 160 coming into contact with the second fixing portion (312 of FIGS. 4A-4C) are positioned within the height 613 of the magnet 611. In case that or if a part of the shock mitigation member 160 positioned within the opening (120 of FIG. 1) of the lens assembly 110 is positioned within the range of the height 613 of the magnet 611, the shock mitigation member 160 may not increase the height of an assembly of the lens assembly 110 and the frame 140.

Figure 8:
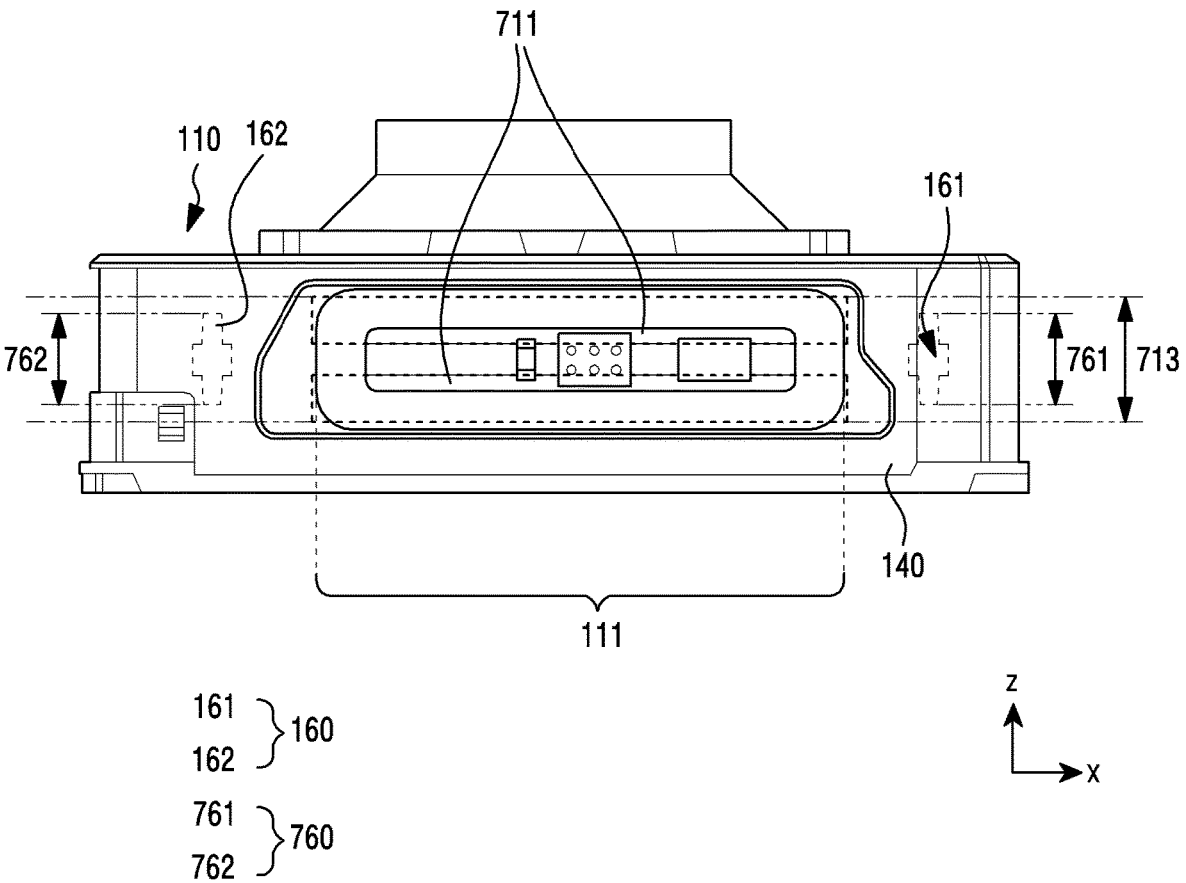
FIG. 8 is a side view illustrating a position of a shock mitigation member according to an embodiment.

FIG. 8 is a side view illustrating a position of the shock mitigation member 160 according to an embodiment.

The actuator 111 according to an embodiment may include at least one magnet 711. The shock mitigation member 160 according to an embodiment may be disposed on a surface opposite to the surface on which the actuator 111 is disposed with reference to the camera module 130. However, the disclosure is not limited thereto, and the shock mitigation member 130 may be disposed in a direction in which the actuator 111 is disposed.

Referring to FIG. 8, when the camera module is viewed from the direction in which the actuator 111 is disposed, the shock mitigation member 160 according to an embodiment may be disposed to be spaced apart from a position where the magnet 711 is disposed. According to an embodiment, the first shock mitigation member 161 may be disposed to be spaced apart from the position, where the magnet 711 is disposed, in a third direction (x-axis direction) perpendicular to an optical axis. The camera module 130 according to an embodiment may further include a second shock mitigation member 162 disposed to be spaced apart from the position, where the magnet 711 is disposed, in a fourth direction (−x-axis direction) opposite to the third direction.

The shock mitigation member 160 according to an embodiment may be disposed such that a height 760 of the shock mitigation member 160 in a direction (z-axis direction) parallel to the optical axis at least partially, preferably at least by a half, particularly preferred completely, overlaps a height 713 of the magnet 711 in a direction parallel to the optical axis. In this specification, the expression that the height of the shock mitigation member 160 overlaps the height of the magnet 711 may imply a case in which the height of at least a part of the area where the shock mitigation member 160 is disposed overlaps at least a part of the height of the area where the magnet 711 is disposed, or a case in which the height of the center of the shock mitigation member 160 is included within the height of the magnet 711. A height 761 of the first shock mitigation member 161 according to an embodiment may at least partially, preferably at least by a half, particularly preferred completely, overlap the height 713 of the magnet 711. A height 762 of the second shock mitigation member 162 according to an embodiment may at least partially, preferably at least by a half, particularly preferred completely, overlap the height 713 of the magnet 711. The height 760 of the shock mitigation member 160, in particular the height 761 of the first shock mitigation member 161 and/or the height 762 of the second shock mitigation member 162, may be smaller than the height 713 of the magnet 711.

According to an embodiment, the shock mitigation member 160 may be disposed such that the height in the optical axis direction of a part of the shock mitigation member 160 coming into contact with the first fixing portion (311 of FIGS. 4A-4C) and the height in the optical axis direction of a part of the shock mitigation member 160 coming into contact with the second fixing portion (312 of FIGS. 4A-4C) are positioned within the height 713 of the magnet 711. The height of the magnet 711 may be the minimum height which is required to be configured in the lens assembly 110 to provide the actuator 111. Accordingly, a part of the shock mitigation member 160 positioned within the opening (120 of FIG. 1) of the lens assembly 110 is positioned within the range of the height 713 of the magnet 711, so that the shock mitigation member 160 may not increase the height of an assembly of the lens assembly 110 and the frame 140.

Figures 9A, 9B, 9C:
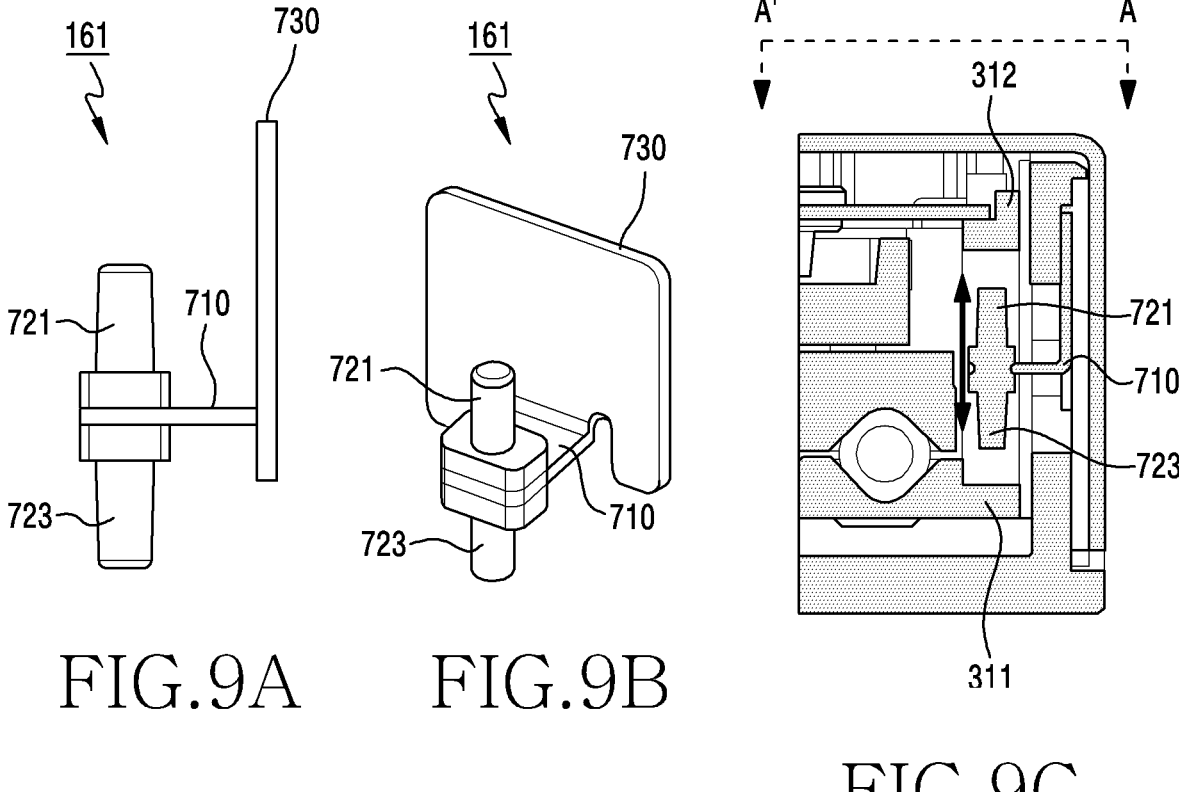
FIGS. 9A-9C are views illustrating a shock mitigation member according to an embodiment.

FIGS. 9A-9C are views illustrating the shock mitigation member 161 according to an embodiment. FIG. 9A is a side view illustrating the shock mitigation member 161. FIG. 9B is a perspective view illustrating the shock mitigation member 161. FIG. 9C is a cross-sectional view illustrating a state in which the shock mitigation member 161 is disposed in the camera module 130.

The shock mitigation member 161 according to an embodiment may include a cantilever 710 having one end fixed to the frame (140 of FIG. 1), and elastic members 721 and 723 disposed at the other end of the cantilever 710. The cantilever 710 may include a plate having elasticity so as to be bendable when the shock mitigation member 161 is in contact with the fixing portion 311 or 312. The elastic members 721 and 723 may include at least one of a first elastic member 723 extending in a direction toward the first fixing portion 311 from one surface of the cantilever 710 or a second elastic member 721 extending in a direction toward the second fixing portion 312 from the other surface of the cantilever 710. The elastic members 721 and 723 may include a material capable of absorbing a shock while being compressed at the time of being in contact with the fixing portions 311 and 312. The elastic members 721 and 723 may include a reversible elastically deformable material. The reversible elastically deformable material may be reversible elastically deformable in the first direction 321 and in the second direction 322 between the first fixing portion 311 and the second fixing portion 312. For example, the elastic members 721 and 723 may include at least one of an elastomer or a sponge.

The shock mitigation member 161 according to an embodiment may include a connection portion 730 for fixing one end of the cantilever 710 to the frame (140 of FIG. 1). For example, the connection portion 730 may include a plate extending from the one end of the cantilever 710. The connection portion 730 is fixed to the frame (140 of FIG. 1), so that the one end of the cantilever 710 may be fixed to the frame (140 of FIG. 1).

The first elastic member 723 may come into contact with the first fixing portion 311 by movement of the lens assembly (110 of FIG. 1) of the camera module 130 according to an embodiment. Alternatively, the second elastic member 721 may come into contact with the second fixing portion 312 by movement of the lens assembly (110 of FIG. 1).

Figures 10A, 10B, 10C:
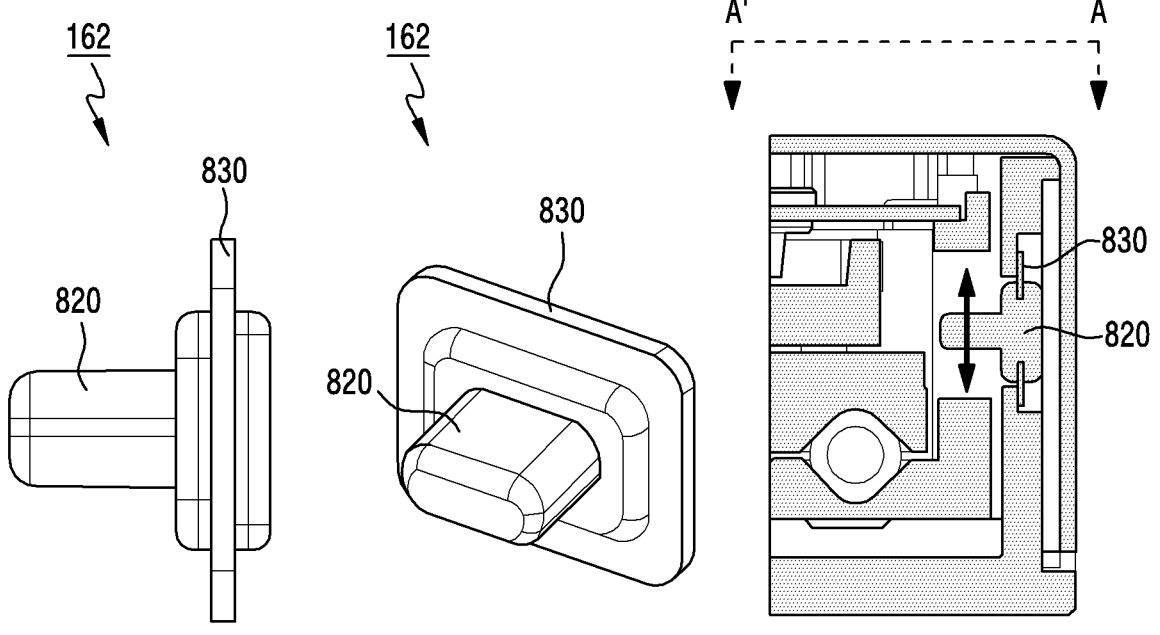
FIGS. 10A-10C are views illustrating a shock mitigation member according to an embodiment.

FIGS. 10A-10C are views illustrating the shock mitigation member 162 according to an embodiment. FIG. 10A is a side view illustrating the shock mitigation member 162. FIG. 10B is a perspective view illustrating the shock mitigation member 162. FIG. 10C is a cross-sectional view illustrating a state in which the shock mitigation member 162 is disposed in the camera module 130.

The shock mitigation member 162 according to an embodiment may have one end fixed to a plate 830 and include an elastic body 820 extending in a direction toward the lens assembly (110 of FIG. 1) from the one end fixed to the plate 830. The plate 830 may be fixed to the frame (140 of FIG. 1). The elastic body 820 may include a material capable of absorbing a shock while being deformed and/or compressed at the time of being in contact with the fixing portion 311 or 312. The elastic body 820 may include a reversible elastically deformable material. The reversible elastically deformable material may be reversible elastically deformable in the first direction 321 and in the second direction 322 between the first fixing portion 311 and the second fixing portion 312. For example, the elastic body 820 may include at least one of an elastomer or a sponge.

One surface of the elastic body 820 of the lens assembly (110 of FIG. 1) may come into contact with one side within the opening (120 of FIG. 1) by movement of the lens assembly (110 of FIG. 1) of the camera module 130 according to an embodiment. When the one surface of the elastic body 820 is in contact with the one side within the opening (120 of FIG. 1), the elastic body 820 may absorb a shock while being deformed and compressed.

Figure 11:
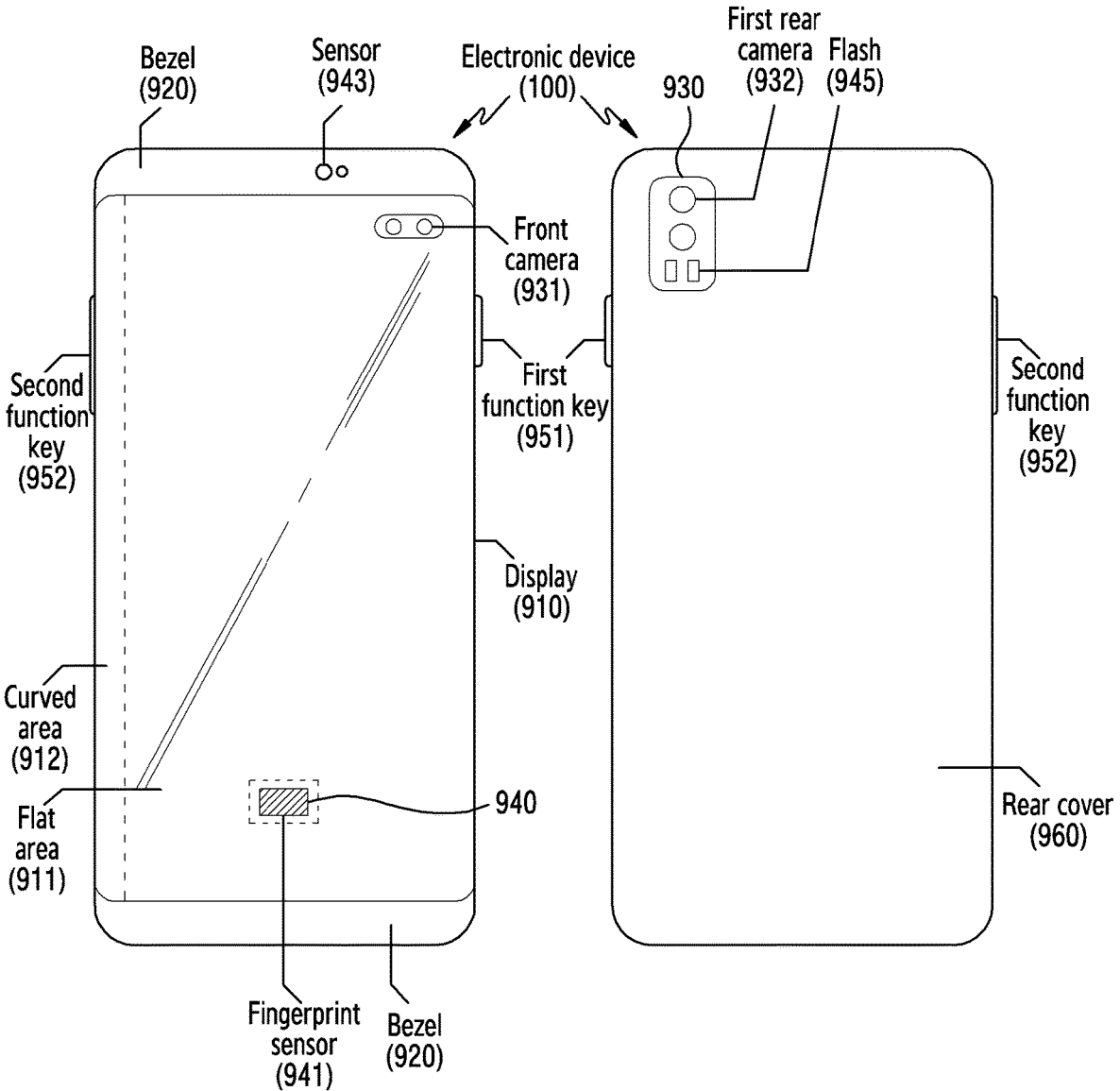
FIG. 11 is a view illustrating an example of an electronic device which may include a camera module according to an embodiment.

FIG. 11 is a view illustrating an example of the electronic device 100 which may include a camera module 130 according to an embodiment.

Referring to FIG. 11, a display 910 may be disposed on a front surface of the electronic device 100 according to an embodiment. In an embodiment, the display 910 may occupy most of the front surface of the electronic device 100. The display 910 and a bezel 920 area surrounding at least partial edge of the display 910 may be disposed on the front surface of the electronic device 100. In the example of FIG. 11, the display 910 may include a flat area 911 and a curved area 912 extending from the flat area 911 toward a lateral surface of the electronic device 100. Although the curved area 912 is shown only on one side (e.g., a left side) in FIG. 11, it may be understood that the curved area is also configured on the opposite side. In addition, the electronic device 100 shown in FIG. 11 is one example, and various embodiments are possible. For example, the display 910 of the electronic device 100 may include only the flat area 911 without the curved area 912, or may include the curved area 912 only at one side edge thereof not both side edges. In addition, according to an embodiment, the curved area may extend to a rear surface of the electronic device 100, so that the electronic device 100 may include an additional flat area.

In an embodiment, a fingerprint sensor 941 for recognizing a user's fingerprint may be included in a first area 940 of the display 910. The fingerprint sensor 941 may be disposed on a lower layer of the display 910, so that the fingerprint sensor may not be recognized by a user or may be disposed to be difficult to recognize. In addition, in addition to the fingerprint sensor 941, an additional sensor for user/biometric authentication may be disposed in a partial area of the display 910. In an embodiment, the sensor for user/biometric authentication may be disposed in one area of the bezel 920. For example, an IR sensor for iris authentication may be exposed through one area of the display 910 or exposed through one area of the bezel 920.

In an embodiment, a front camera 931 may be disposed on the front surface of the electronic device 100. In the embodiment of FIG. 11, the front camera 931 is illustrated to be exposed through one area of the display 910, but in an embodiment, the front camera 931 may be exposed through the bezel 920.

In an embodiment, the electronic device 100 may include one or more front cameras 931. For example, the electronic device 100 may include two front cameras such as a first front camera and a second front camera. In an embodiment, the first front camera and the second front camera may be cameras of the same type having the equivalent specification (e.g., pixels), but the first front camera and the second front camera may be implemented as cameras having different specifications. The electronic device 100 may support a function (e.g., 3D capturing, auto focus, etc.,) related to a dual camera through the two front cameras.

In an embodiment, a rear camera 932 may be disposed on the rear surface of the electronic device 100. The rear camera 932 may be exposed through a camera area 930 of a rear cover 960. In an embodiment, the electronic device 100 may include multiple rear cameras disposed in the camera area 930. For example, the electronic device 100 may include two or more rear cameras. For example, the electronic device 100 may include a first rear camera, a second rear camera, and a third rear camera. The first rear camera, the second rear camera, and the third rear camera may have different specifications. For example, the first rear camera, the second rear camera, and/or the third rear camera may have a different FOV, pixel, aperture, whether optical zoom/digital zoom is supported, and whether an image-shake correction function is supported, and types and arrangements of lens sets included in the cameras may be different. For example, the first rear camera may be a general camera, the second rear camera may be a camera for wide photographing, and the third rear camera may be a camera for telephotographing. In this document, the descriptions of functions or attributes of the front camera may be applied to the rear camera, and vice versa.

In an embodiment, various types of hardware or sensors which assist photographing, such as a flash 945, may be additionally disposed in the camera area 930. For example, a distance sensor (e.g., a TOF sensor) for detecting a distance between a subject and the electronic device 100, and the like may be further included.

In an embodiment, at least one physical key may be disposed in a lateral portion of the electronic device 100. For example, a first function key 951 for turning on/off the display 910 or turning on/off power of the electronic device 100 may be disposed at a right edge with reference to the front surface of the electronic device 100. In an embodiment, a second function key 952 for controlling the volume of the electronic device 100 or screen brightness of the electronic device may be disposed at a left edge with reference to the front surface of the electronic device 100. In addition thereto, an additional button or key may be disposed on the front surface or the rear surface of the electronic device 100. For example, a physical button or a touch button mapped to a specific function may be disposed in a lower end area of the bezel 920 of the front surface.

The electronic device 100 shown in FIG. 11 corresponds to one example, and does not limit the shape of a device to which the technical idea disclosed herein is applied. The technical idea disclosed herein is applicable to various user devices including a first camera module facing a first direction and a second camera module facing a direction different from the first direction. For example, by employing the flexible display 910 and a hinge structure, the technical idea disclosed herein may be applied to a foldable electronic device which can be folded in a horizontal direction or can be folded in a vertical direction, a tablet, or a laptop computer. In addition, the technical idea may be applied even when the first camera module and the second camera module facing the same direction can be arranged to face different directions through rotation, folding, deformation, etc., of the device.

Since many features (except those of the independent claims) are optional only, the features of the preferred embodiments have been described in connection with "may". Nevertheless, said preferred embodiments have to understood to be disclosed as specific preferred combinations as shown in the drawings and therefore features shown in the drawings are to be understood as a real preferred combination for the present invention which however does not restrict the scope of the invention.

A camera module according to an embodiment may include a frame, at least one shock mitigation member having one end fixed to the frame, and a lens assembly configured to receive at least one lens and disposed to be movable in a first direction and/or a second direction opposite to the first direction within the frame.

The lens assembly may include a first fixing portion configured on one side thereof and a second fixing portion disposed to be spaced apart from the first fixing portion in the first direction.

At least a part of the at least one shock mitigation member may be disposed between the first fixing portion and the second fixing portion and disposed and/or configured to come into contact with the first fixing portion as the lens assembly moves in the first direction. Additionally or alternatively, the at least one shock mitigation member may be disposed and/or configured to come into contact with the second fixing portion as the lens assembly moves in the second direction.

The camera module according to an embodiment may further include an actuator including a magnet configured to move the lens assembly. The at least one shock mitigation member may be disposed such that a height thereof in a direction parallel to an optical axis of the at least one lens at least partially, preferably at least by a half, particularly preferred completely, overlaps the magnet.

In the camera module according to an embodiment, the at least one shock mitigation member may be configured such that, in a state in which the at least one shock mitigation member is in contact with the first fixing portion or the second fixing portion after movement of the lens assembly according to power supply to the actuator, at least a part of the at least one shock mitigation member is bent by a driving force of the actuator.

In the camera module according to an embodiment, the at least one shock mitigation member may include a first shock mitigation member disposed to be spaced apart from the magnet in a third direction perpendicular to the optical axis.

In the camera module according to an embodiment, the at least one shock mitigation member may further include a second shock mitigation member disposed to be spaced apart from the magnet in a fourth direction opposite to the third direction.

In the camera module according to an embodiment, the frame may further include a third fixing portion configured to limit movement of the lens assembly by coming into contact with the lens assembly as the lens assembly moves in the first direction or the second direction. The shock mitigation member may be disposed so as to come into contact with the first fixing portion or the second fixing portion before the lens assembly comes into contact with the third fixing portion as the lens assembly moves in the first direction or the second direction.

In the camera module according to an embodiment, the shock mitigation member may include a cantilever having one end fixed to the frame, and an elastic member disposed at the other end of the cantilever.

In the camera module according to an embodiment, the cantilever may include a plate having elasticity. The elastic member may have a protrusion shape extending from both surfaces of the plate in the first direction and the second direction.

In the camera module according to an embodiment, the plate may be formed of a metal material, and the elastic member may be formed of an elastomer.

In the camera module according to an embodiment, the elastic member may be configured to come into contact with or be spaced apart from the first fixing portion or the second fixing portion as the lens assembly moves.

In the camera module according to an embodiment, the shock mitigation member may include an elastic body comprising one end fixed to the plate and extending in a direction toward the lens assembly from the one end fixed to the plate.

A camera module according to an embodiment may include a frame, a lens assembly configured to receive at least one lens and including a recess or an opening disposed on one side thereof, an actuator configured to move the lens assembly in a direction parallel to an optical axis of the at least one lens, and a shock mitigation member configured to protrude from the frame into the recess or the opening to be at least partially received in the recess or the opening. The shock mitigation member may be configured to come into contact with one side of the recess or the opening by movement of the lens assembly.

In the camera module according to an embodiment, the shock mitigation member may be disposed such that a height thereof in a direction parallel to the optical axis of the at least one lens at least partially, preferably at least by a half, particularly preferred completely, overlaps the actuator.

The camera module according to an embodiment may further include a fixing portion configured to limit a movement range of the lens assembly by coming into contact with the lens assembly by movement of the lens assembly. The shock mitigation member may be configured to come into contact with the one side of the recess or the opening before the lens assembly comes into contact with the fixing portion.

In the camera module according to an embodiment, the shock mitigation member may include a cantilever-shaped plate having one end fixed to the frame and the other end to which an elastic member is coupled.

The shock mitigation member of the camera module according to an embodiment may be configured such that the elastic member comes into contact with the one side of the recess or the opening by movement of the lens assembly.

An electronic device according to an embodiment may include a camera module, a memory configured to store instructions, and a processor configured to execute the instructions to control an operation of the camera module. The camera module may include a frame, at least one shock mitigation member having one end fixed to the frame, a lens assembly configured to receive at least one lens and disposed to be movable in a first direction or a second direction opposite to the first direction within the frame, and an actuator configured to move the lens assembly under a control of the processor.

The lens assembly may include a first fixing portion configured on one side thereof and a second fixing portion disposed to be spaced apart from the first fixing portion in the first direction. At least a part of the at least one shock mitigation member may be disposed between the first fixing portion and the second fixing portion. The at least one shock mitigation member may be disposed to come into contact with the first fixing portion as the lens assembly moves in the first direction in a state in which power is not supplied to the actuator, or to come into contact with the second fixing portion as the lens assembly moves in the second direction.

The actuator of the electronic device according to an embodiment may include a magnet. The at least one shock mitigation member may be disposed such that a height thereof in a direction parallel to an optical axis of the at least one lens at least partially, preferably at least by a half, particularly preferred completely, overlaps the magnet.

The shock mitigation member of the electronic device according to an embodiment may include a cantilever having one end fixed to the frame, and an elastic member disposed at the other end of the cantilever.

The cantilever of the electronic device according to an embodiment may include a plate having elasticity. The elastic member may have a protrusion shape extending from both surfaces of the plate in the first direction and the second direction.

In addition to the foregoing explanations, the following enumerated aspects 1 to 15 are also relevant for the present disclosure.

Aspect 1: A camera module (130) comprising:
a frame (140);
at least one shock mitigation member (160) having one end fixed to the frame (140); and a lens assembly (110) configured to receive at least one lens (114) and disposed to be movable in a first direction (321) and/or a second direction (322) opposite to the first direction (321) within the frame (140), wherein the lens assembly (110) comprises a first fixing portion (311) configured on one side thereof and a second fixing portion (312) disposed to be spaced apart from the first fixing portion (311) in the first direction (321), and at least a part of the at least one shock mitigation member (160) is disposed between the first fixing portion (311) and the second fixing portion (312) and is configured to come into contact with the first fixing portion (311) as the lens assembly (110) moves in the first direction (321) and/or to come into contact with the second fixing portion (312) as the lens assembly (110) moves in the second direction (322).

This has the advantage that a moving speed of the lens assembly in the first and/or second directions may be reduced by compression or deformation of the shock mitigation member generated by the contact between the first fixing portion and/or the second fixing portion and the shock mitigation member. Accordingly, the amount of shock generated by the lens assembly moving in the first direction and/or the second direction to collide with another component may be reduced.

Aspect 2: The camera module (130) of aspect 1, wherein the camera module (130) further comprises an actuator (111, 112) configured to move the lens assembly (110), and the at least one shock mitigation member (160) is disposed such that a height thereof in a direction parallel to an optical axis of the at least one lens (114) at least partially, preferably at least by a half, particularly preferred completely, overlaps the actuator (111, 112).

This has the advantage that the camera module reduces a degree of protrusion to the outside of a device having a small thickness, such as a smartphone, by not increasing the size (for example, the height of the entire camera module compared to the height of a lens barrel portion) of the camera module while including a shock mitigation member.

Aspect 3: The camera module (130) of aspect 2, wherein the actuator (111, 112) comprises a magnet configured to move the lens assembly (110), and the at least one shock mitigation member (160) is disposed such that the height thereof in the direction parallel to the optical axis of the at least one lens (114) at least partially, preferably at least by a half, particularly preferred completely, overlaps the magnet. Advantageously, using a magnet-based actuator improves the compactness of the camera module.

Aspect 4: The camera module (130) of aspect 2 or 3, wherein the at least one shock mitigation member (160) is configured such that, in a state in which the at least one shock mitigation member (160) is in contact with the first fixing portion (311) or the second fixing portion (312) after movement of the lens assembly (110) according to power supply to the actuator (111, 112), at least a part (165) of the at least one shock mitigation member (160) is bent by a driving force of the actuator (111, 112). Bending the shock mitigation member is advantageously used to reduce the moving speed of the lens assembly.

Aspect 5: The camera module (130) of any one of aspects 2 to 4, wherein the at least one shock mitigation member (160) comprises a first shock mitigation member (161) disposed to be spaced apart from the actuator (111, 112) or the magnet in a third direction perpendicular to the optical axis. This has the advantage that the camera module including a first shock mitigation member can be designed compactly.

Aspect 6: The camera module (130) of aspect 5, wherein the at least one shock mitigation member (160) further comprises a second shock mitigation member (162) disposed to be spaced apart from the magnet in a fourth direction opposite to the third direction. This has the advantage that the camera module including two shock mitigation members can be designed compactly.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program #40) including one or more instructions that are stored in a storage medium (e.g., the internal memory #36 or external memory #38) that is readable by a machine (e.g., the electronic device #01). For example, a processor (e.g., the processor #20) of the machine (e.g., the electronic device #01) may invoke at least one of the one or more stored instructions from the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

The invention claimed is:

1. A camera module comprising:
a frame;
at least one shock mitigation member having one end fixed to the frame; and
a lens assembly configured to receive at least one lens and disposed to be movable in a first direction and/or a second direction opposite to the first direction within the frame,
wherein the lens assembly comprises a first fixing portion configured on one side thereof and a second fixing portion disposed to be spaced apart from the first fixing portion in the first direction, and
at least a part of the at least one shock mitigation member is disposed between the first fixing portion and the second fixing portion and is configured to come into contact with the first fixing portion as the lens assembly moves in the first direction and/or to come into contact with the second fixing portion as the lens assembly moves in the second direction.

2. The camera module of claim 1, wherein the camera module further comprises an actuator comprising a magnet configured to move the lens assembly, and
the at least one shock mitigation member is disposed such that a height thereof in a direction parallel to an optical axis of the at least one lens at least partially overlaps the magnet.

3. The camera module of claim 2, wherein the actuator comprises a magnet configured to move the lens assembly, and
the at least one shock mitigation member is disposed such that the height thereof in the direction parallel to the optical axis of the at least one lens at least partially overlaps the magnet.

4. The camera module of claim 2, wherein the at least one shock mitigation member is configured such that, in a state in which the at least one shock mitigation member is in contact with the first fixing portion or the second fixing portion after movement of the lens assembly according to power supply to the actuator, at least a part of the at least one shock mitigation member is bent by a driving force of the actuator.

5. The camera module of claim 2, wherein the at least one shock mitigation member comprises a first shock mitigation member disposed to be spaced apart from the actuator or the magnet in a third direction perpendicular to the optical axis.

6. The camera module of claim 4, wherein the at least one shock mitigation member further comprises a second shock mitigation member disposed to be spaced apart from the magnet in a fourth direction opposite to the third direction.

7. The camera module of claim 1, wherein the frame further comprises a third fixing portion configured to limit movement of the lens assembly by coming into contact with the lens assembly as the lens assembly moves in the first direction or the second direction, and
the shock mitigation member is disposed so as to contact with the first fixing portion or the second fixing portion before the lens assembly comes into contact with the third fixing portion as the lens assembly moves in the first direction or the second direction.

8. The camera module of claim 1, wherein the shock mitigation member comprises:
a cantilever having one end fixed to the frame; and
an elastic member disposed at other end of the cantilever.

9. The camera module of claim 7, wherein the cantilever comprises a plate having elasticity, and
the elastic member has a protrusion shape extending from both surfaces of the plate in the first direction and the second direction.

10. The camera module of claim 8, wherein the plate is formed of a metal material, and
the elastic member is formed of an elastomer.

11. The camera module of claim 8, wherein the elastic member is configured to come into contact with or be spaced apart from the first fixing portion or the second fixing portion as the lens assembly moves.

12. The camera module of claim 8, wherein the shock mitigation member comprises an elastic body comprising one end fixed to the plate and extending in a direction toward the lens assembly from the one end fixed to the plate.

13. A camera module comprising:
a frame;
a lens assembly configured to receive at least one lens and comprising a recess or an opening disposed on one side thereof;
an actuator configured to move the lens assembly in a direction parallel to an optical axis of the at least one lens; and
a shock mitigation member is configured to protrude from the frame into the recess or the opening to be at least partially received in the recess or the opening,
wherein the shock mitigation member is configured to come into contact with one side of the recess or the opening by movement of the lens assembly.

14. The camera module of claim 13, further comprising a fixing portion configured to limit a movement range of the lens assembly by contacting with the lens assembly by movement of the lens assembly, wherein the shock mitigation member is configured to come into contact with the one side of the recess or the opening before the lens assembly comes into contact with the first fixing portion or the second fixing portion.

15. The camera module of claim 12, wherein the shock mitigation member comprises a cantilever-shaped plate having one end fixed to the frame and other end to which an elastic member is coupled.

16. The camera module of claim 13, wherein the shock mitigation member comprises an elastomer member having one end fixed to the frame and extended toward the recess or the opening.

17. An electronic device comprising:

a camera module;

a memory configured to store instructions; and a processor configured to execute the instructions to control an operation of the camera module, wherein the camera module comprises a frame, at least one shock mitigation member having one end fixed to the frame, a lens assembly configured to receive at least one lens and disposed to be movable in a first direction or a second direction opposite to the first direction within the frame, and an actuator configured to move the lens assembly under a control of the processor, and wherein the lens assembly comprises a first fixing portion configured on one side thereof and a second fixing portion disposed to be spaced apart from the first fixing portion in the first direction, and at least a part of the at least one shock mitigation member is disposed between the first fixing portion and the second fixing portion to come into contact with the first fixing portion as the lens assembly moves in the first direction in a state in which power is not supplied to the actuator, or to come into contact with the second fixing portion as the lens assembly moves in the second direction.

18. The electronic device of claim 17, wherein the actuator comprises a magnet, and the at least one shock mitigation member is disposed such that a height thereof in a direction parallel to an optical axis of the at least one lens at least partially overlaps the magnet.

19. The electronic device of claim 17, wherein the shock mitigation member comprises:

a cantilever having one end fixed to the frame; and an elastic member disposed at other end of the cantilever.

20. The electronic device of claim 19, wherein the cantilever comprises a plate having elasticity, and the elastic member has a protrusion shape extending from both surfaces of the plate in the first direction and the second direction.

* * * * *